United States Patent
Saito

(10) Patent No.: US 6,957,082 B2
(45) Date of Patent: Oct. 18, 2005

(54) ELECTRONIC DEVICE HAVING POWER SAVING FUNCTION AND EXTENSION UNIT

(75) Inventor: Keiji Saito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 449 days.

(21) Appl. No.: 10/058,399

(22) Filed: Jan. 30, 2002

(65) Prior Publication Data

US 2002/0115481 A1 Aug. 22, 2002

(30) Foreign Application Priority Data

Feb. 22, 2001 (JP) ........................................ 2001-046734

(51) Int. Cl.[7] .............................................. H04M 1/38
(52) U.S. Cl. .............................. 455/556.1; 455/556.2; 455/572; 455/557; 455/558; 455/574
(58) Field of Search ................................. 455/572, 574, 455/558, 557, 556.2, 127.1, 127.5, 343.5, 343.6, 573, 556.1

(56) References Cited

U.S. PATENT DOCUMENTS

| | | | |
|---|---|---|---|
| 5,463,261 A | | 10/1995 | Skarda et al. |
| 5,519,757 A | * | 5/1996 | Torin ........................... 455/574 |
| 5,584,055 A | | 12/1996 | Murui et al. |
| 5,659,890 A | * | 8/1997 | Hidaka ....................... 340/7.54 |
| 5,689,821 A | * | 11/1997 | Shimazaki ................... 708/109 |
| 5,802,379 A | | 9/1998 | Boatwright et al. |
| 6,021,332 A | | 2/2000 | Alberth, Jr. et al. |
| 6,026,119 A | * | 2/2000 | Funk et al. .................. 375/222 |
| 6,128,511 A | * | 10/2000 | Irie ............................. 455/558 |
| 6,493,326 B1 | * | 12/2002 | Ramachandran ............ 370/311 |

FOREIGN PATENT DOCUMENTS

| | | |
|---|---|---|
| EP | 0 608 899 | 8/1994 |
| GB | 2 348 577 | 10/2000 |
| JP | 59-112320 | 6/1984 |
| JP | 2-244209 | 9/1990 |
| JP | 6-289955 | 10/1994 |
| JP | 7-84684 | 3/1997 |
| JP | 6-222940 | 8/1997 |
| JP | 2000-112571 | 4/2002 |
| WO | WO 91/14332 | 9/1991 |
| WO | WO 97/49077 | 12/1997 |
| WO | WO 00/78082 | 12/2000 |

OTHER PUBLICATIONS

Communication enclosing International Search Report from the European Patent Office mailed on Mar. 23, 2005 in Application No. EP 02002715.

* cited by examiner

*Primary Examiner*—Lee Nguyen
*Assistant Examiner*—Minh D. Dao
(74) *Attorney, Agent, or Firm*—Finnegan, Henderson, Farabow, Garrett & Dunner, L.L.P.

(57) ABSTRACT

When the connector of an electronic card device is mated with the connector of a host device with the main power supply of the host device being turned off, a power supply control unit in the host device starts the supply of power to the card device. When no operating command is received from the host device within a fixed period after the start of reception of power, a central processing unit of the card device determines that the main power supply of the host device is turned off and starts radio communication using a radio communication unit on the basis of operating commands stored in an information storage unit.

7 Claims, 5 Drawing Sheets

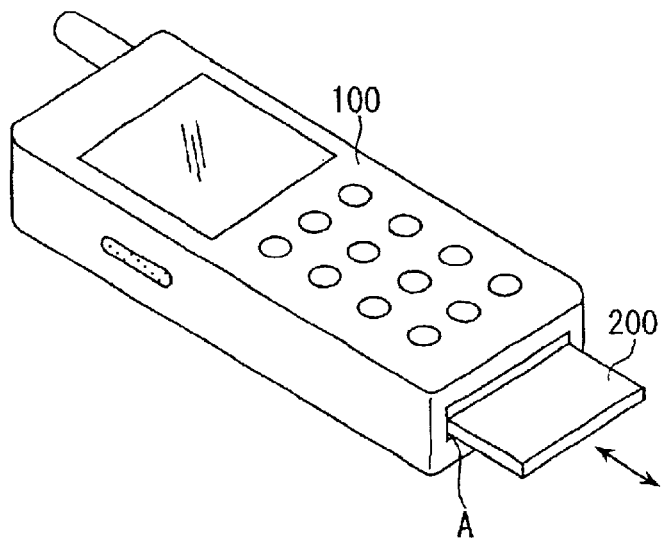
FIG. 1
```
Row No.1:Inquiry(GIAC);
Row No.2:waitEvent(Inquiry Result, BA_ADDR==0×123456789abc);
Row No.3:Create_Connection(BA_ADDR=0123456789abc);
Row No.4:Send Data(¥data¥*.*);
Row No.5:Disconnect( );
```
FIG. 4
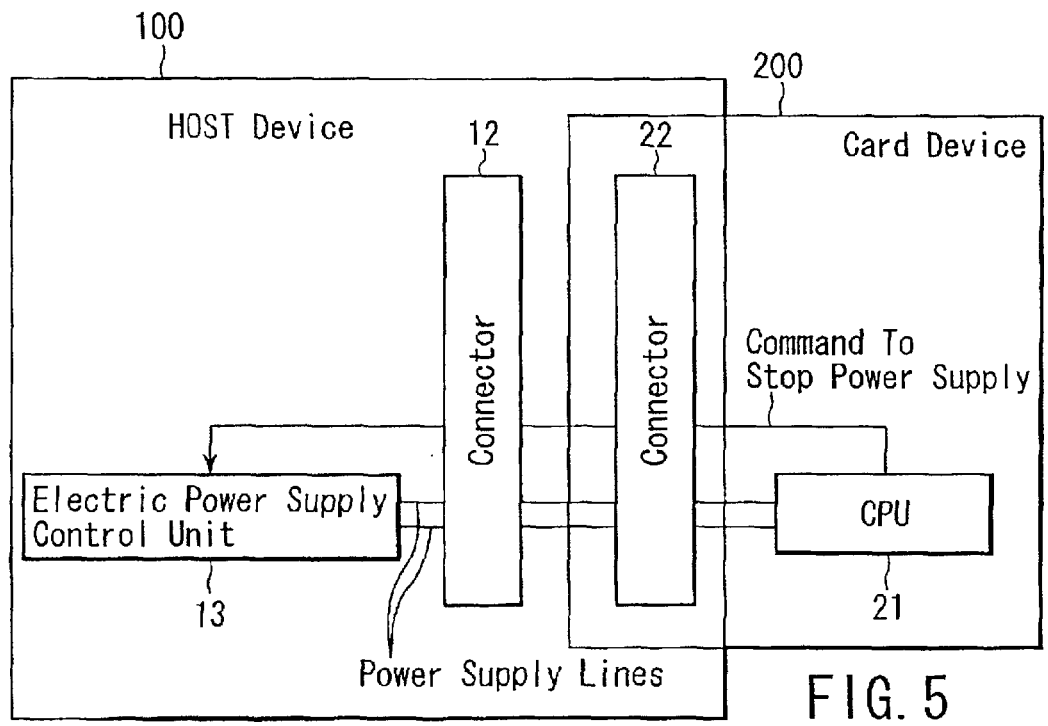
FIG. 5

ELECTRONIC DEVICE HAVING POWER SAVING FUNCTION AND EXTENSION UNIT

CROSS-REFERENCE TO RELATED APPLICATIONS

This application is based upon and claims the benefit of priority from the prior Japanese Patent Application No. 2001-046734, filed Feb. 22, 2001, the entire contents of which are incorporated herein by reference.

BACKGROUND OF THE INVENTION

1. Field of the Invention

This invention relates to an electronic device, such as a cellular phone, and an expansion unit, such as a card type of modem, that can be plugged into the cellular phone, and more specifically to an electronic device and an expansion unit which increase the efficiency in supply of electric power from the electronic device to the expansion unit and thus significantly reduce the power dissipation of the electronic device.

2. Description of the Related Art

In recent years, there have been significant advances in information processing and communications technologies. In addition, there have also been marked improvements in techniques to manufacture precision parts, typically semiconductor integrated circuits. Based on these technical advances and improvements, various battery-powered electronic devices, such as personal digital assistants (PDAs), that have radio communications functions built in have recently been developed.

Most of such electronic devices are equipped with an expansion slot in order to meet the needs of users. That is, by allowing each user to plug one of various expansion units into the slot according to his or her requirements, the devices are enabled to have only basic functions built in. This allows the electronic devices to be reduced in size and weight.

The expansion unit operates from electric power supplied from the electronic device into which it is plugged. On the other hand, the electronic device is configured to apply electric power to the expansion unit only when its main power supply is turned on.

The expansion unit can operate by itself on power supplied from the electronic device. Even in employing only the function that the expansion unit provides, the user is required to turn on the main power supply of the electronic device.

In other words, the supply of power to the expansion unit results in the supply of power to the entire electronic device and consequently in wasteful power discharge of the battery.

BRIEF SUMMARY OF THE INVENTION

It is therefore an object of the invention to provide an electronic device and an expansion unit which allow efficiency in the supply of power from the electronic device to the expansion unit to be improved to thereby reduce power dissipation of the electronic device.

According to an aspect of the invention, there is provided an electronic device in which an expansion unit is removably connected, comprising: a command device configured to give a command to supply power to the expansion unit; and a power supply control device configured to start the supply of power to the expansion unit when a command is given by the command device in a state where the electronic device is turned off.

According to another aspect of the invention, there is provided an expansion unit powered from an electronic device for increasing the functions of the electronic device comprising: a detection device configured to detect the presence or absence of power from the electronic device; and a control device configured to carry out a given processing when no operating command comes from the electronic device within a predetermined period after power from the electronic device has been detected by the detection device.

According to the invention, the electronic device, even if its main power supply is turned off, starts the supply of power to the expansion unit in response to the expansion unit being attached to the electronic device. On the other hand, the expansion unit, after having started receiving power from the electronic device, starts its own operation after confirmation of the absence of any operating command from the electronic device.

Thus, the invention allows efficiency in power supply from the electronic device to the expansion unit to be improved, thereby reducing power dissipation of the electronic device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate of the invention, and together with the general description given above and the detailed description of the embodiments given below, serve to explain the principles of the invention.

FIG. 1 is an exterior view of a system according to a first embodiment of the invention;

FIG. 4 shows exemplary operating commands stored in information storage of the card type of electronic device in the system of FIG. 1;

FIG. 5 shows the configuration of a system according to a second embodiment of the invention;

DETAILED DESCRIPTION OF THE INVENTION

The embodiments of the invention will be described hereinafter.

[First Embodiment]

FIG. 1 shows, in perspective view, a system according to a first embodiment of the invention. As shown in FIG. 1, the system is composed of a host device 100 and a card type of electronic device (hereinafter referred to as an electronic card device or card device) 200 which can be plugged into a slot A of the host device.

The host device 100, which is a so-called cellular phone, has basic functions built in for enabling communication over public wireless networks. In addition, the host device has an expansion slot into which the electronic card device 200 is inserted when necessary to increase its functions.

The electronic card device 200, which is an expansion unit having a radio communication function and a memory function, is inserted into the slot of the host device 100 and operates upon receiving electric power from the host device.

Figure 2:
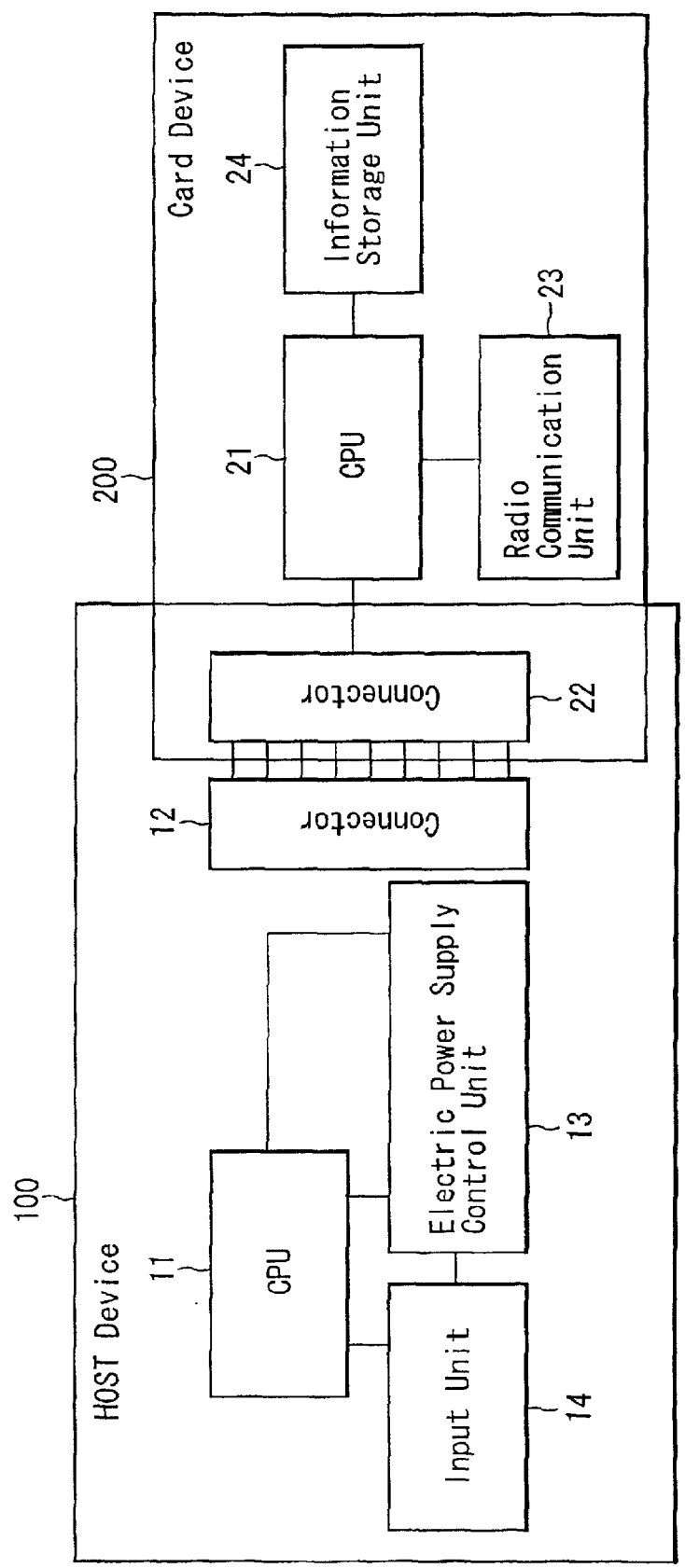
FIG. 2 shows the configuration of the system of FIG. 1.

FIG. 2 shows the configuration of the system according to the first embodiment. The host device 100 includes a central processing unit (CPU) 11, a connector 12, an electric power supply control unit 13, and an input unit 14. The card device 200 includes a central processing unit 21, a connector 22, a radio communication unit 23, and an information storage unit 24.

The central processing unit 11 provides overall control of the host device 100 and communicates with the card device 200 via the connector 12. The connector 12 mates with the connector 22 of the card device. Among a number of signal lines completed by the connectors 12 and 22 are electric power supply lines and data lines.

The power supply control unit 13 provides power to the entire host device 100 and to the card device 200 via the connector 12. The input unit 14 performs various operations on the host device 100. Specifically, the input unit consists of switches, buttons, a keypad, or a touch panel.

The central processing unit 21 in the card device 200 controls the radio communication unit 23 and the information storage unit 24 and communicates with the host device 100 via the connector 22. The connector 22 mates with the connector 12. The radio communication unit 23 communicates with radio communication devices. The information storage unit 24 sends or receives data to or from the central processing unit 24.

Figure 3:
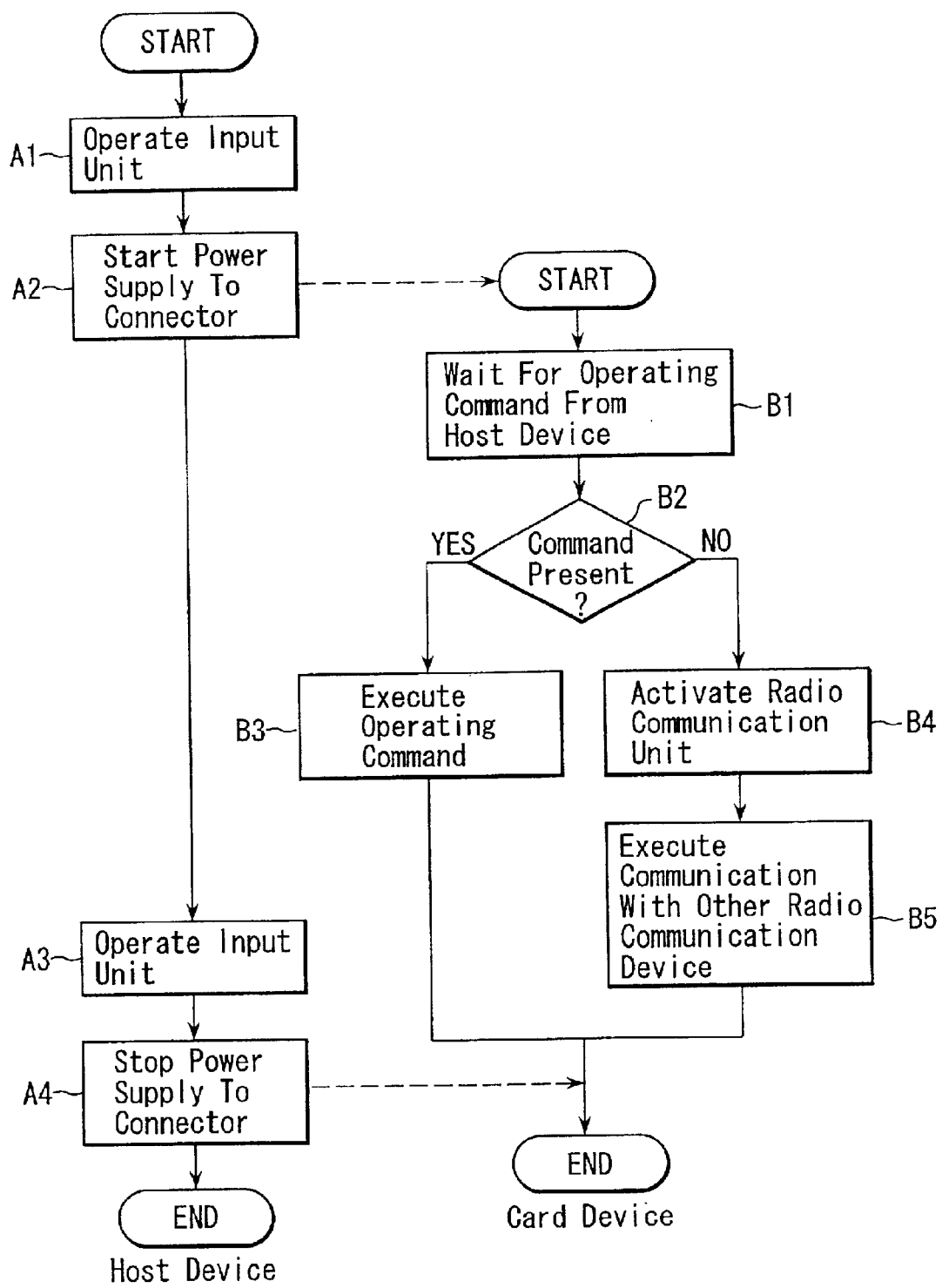
FIG. 3 is a flowchart illustrating the operating procedure of the system of FIG. 1.

Next, reference is made to a flowchart of FIG. 3 to describe the operating procedure of the system of the first embodiment.

In the initial state of the host device 100, its main power supply is off and the supply of power to the card device 200 is off. It is not until the input unit 14 is operated that electric power is supplied to the card device.

When the input unit 14 is operated to select the supply of power to the card device 200 (step A1), the electric power supply control unit 13 supplies electric power to the connector 22 of the card device 200 via the connector 12 (step A2). Thus, the system has entered the mode in which power is supplied to the card device with the main power supply turned off.

Upon receiving power over the electric power supply lines in the connector 22, the central processing unit 21 in the card device 200 starts working and then waits for an operating command sent from the host device 100 over the data lines in the connector 22 (step B1). The card device determines the subsequent operation depending on whether or not it receives an operating command from the host device within a fixed period (step B2).

If an operating command is received from the host device within the fixed period (YES in step B2), the central processing unit 21 of the card device 200 carries out a process specified by that command (step B3); otherwise (NO in step B2), the central processing unit 21 enables the radio communication unit 23 to communicate by radio with another radio communication device (step B4). The radio communication unit 23 communicates by radio with the other radio communication device for transmission and reception of data (step B5). The central processing unit 21 transmits data from the information storage unit 24 via the radio communication unit 23 or writes data received by the radio communication unit to the storage unit. After radio communication with the other radio communication device is terminated, the supply of power to the card device is stopped by operating the input unit (step A4) and the system returns to the initial state.

Thus, the system allows the radio communication function of the card device to be employed without turning on the main power supply of the host device, thereby allowing power dissipation of the host device to be reduced significantly.

In the basic operation of the system described here, the card device 200 is configured to activate the radio communication unit 23 only for the purpose of enabling radio communication. However, the contents of communication (what kind of data to transmit or receive) are defined by other radio communication devices and not by the card device. Next, a description is given of such a configuration as to prestore in the information storage unit 24 a group of operating commands that defines the contents of communication and, at the time of radio communication, communicate according to the operating commands.

The operating commands are stored in the information storage unit 24 in a predetermined format. In the first embodiment, it is supposed that the radio communication unit 23 conforms to the Bluetooth standard. The exemplary operating commands stored in the information storage unit 24 are illustrated in FIG. 4.

As shown in FIG. 4, the operating commands comprise commands that conform to Host Controller Interface specifications in the Bluetooth standard, extension commands that permit access to data stored in the information storage unit 24, and structured languages that cause conditional branches according to events and parameters obtained as the results of executing those commands. The operating commands are stored in the information storage unit 24 under the file name of "script.txt".

Returning to the flowchart of FIG. 3, the radio communication unit 23 is activated in step B4. After that, the central processing unit 21 interrogates the information storage unit 24 about the presence or absence of the file "script.txt". In the presence of the file, the information processing unit executes the operating commands in sequence. In the example of FIG. 4, the central processing unit executes the Inquiry command using general-purpose inquiry access codes (GIAC) to acquire various pieces of information, such as Bluetooth device addresses of radio communication devices with which the present device can communicate by radio, and clock offset (row number: 1).

After that, the device waits for an Inquiry Result event from a radio communication device having a Bluetooth device address of "0x123456789abc" (row number: 2) and then establishes a connection with that radio communication device (row number: 3). Next, all files existing under directory "data" stored in the information storage unit 24 are sent to the said radio communication device with which a connection has been established (row number: 4). On the completion of file transmission, the connection with the said radio communication device is cut (row number: 5).

Thus, storing operating commands in the information storage unit 24 in advance enables the electronic card device 200 to determine the contents of radio communication for itself (as opposed to being directed by other radio communication devices).

[Second Embodiment]

Next, a second embodiment of the invention will be described.

If, as in the first embodiment, operating commands that determine the contents of communication have been stored in the information storage unit 24 in the card device 200, it becomes possible for the card device to detect the termination of radio communication. The second embodiment is therefore directed to a system in which, at the termination of radio communication, a command is sent from the card device to the host device to stop the supply of power, that is, the supply of power to the card device is automatically stopped without the need to operate the input unit of the host device.

When, in the mode in which power is supplied to the card device 200 with the main power supply of the host device 100 turned off, the central processing unit 21 of the card device can detect the termination of radio communication, it sends a power supply stop command through the connectors 22 and 12 to the power supply control unit 13 in the host device 100, for example, when operating commands defined as in the first embodiment are terminated. Specifically, as shown in FIG. 5, one of the data lines in the connectors 12 and 22 is used for transferring the power supply stop command and, when the potential on that data line goes high (for example, from ground level to +3.3V), the power supply control unit 13 stops the supply of power to the card device 200.

Thus, the supply of power from the host device 100 to the card device 200 can be stopped automatically at the termination of radio communication by the card device, allowing wasteful power dissipation of the host device to be further reduced.

[Third Embodiment]

A third embodiment of the invention will be described next.

When the supply of power is automatically stopped through a command from the card device at the termination of radio communication as in the second embodiment, it is important that the user be notified. As a means therefor, it is desirable to separate physically the card device 200 from the host device 100, i.e., eject the card device. This allows the user to know visually and easily that the supply of power has been stopped. The third embodiment is therefore directed to a system such that the host device has a mechanism to break the physical connection of its connector 12 with the connector 22 of the card device and to push the card device out of its slot.

Figure 6:
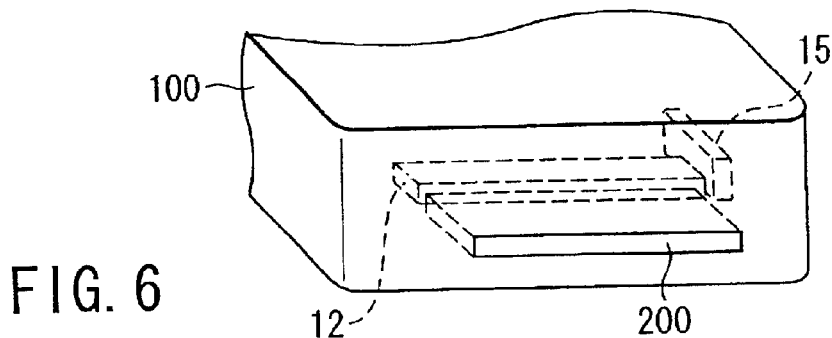
FIGS. 6 and 7 show the operation of an eject mechanism of the host device in a system according to a third embodiment of the invention.
Figure 7:
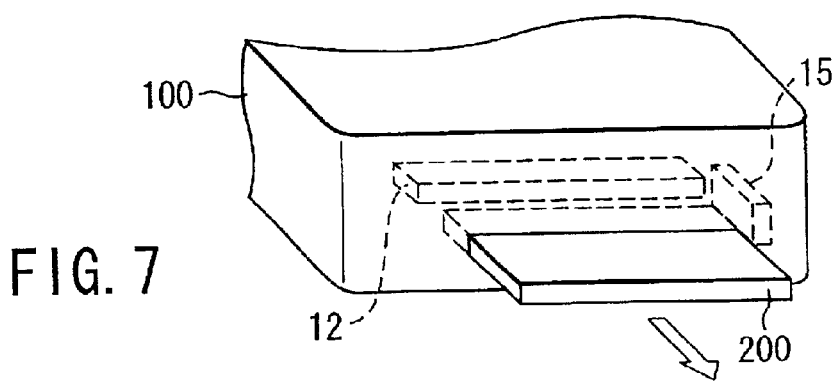

The power supply control unit 13 of the host device 100 issues a command to eject the card device 200 to the eject mechanism of the connector 12 at the termination of the mode in which power is supplied to the card device with the main power supply of the host device being off, as when the mode is changed by the input unit 14 of the host device or when the host device is commanded by the card device to stop the supply of power thereto. FIGS. 6 and 7 show the eject mechanism of the host device 100. Specifically, FIG. 6 shows the state in which the card device is plugged in and FIG. 7 shows the state in which the card device is ejected.

Upon receiving an eject command, the connector 12 electrically separates the card device 200. The host device 100 has an actuator, such as a linear motor, that ejects the card device and responds to an eject command from the power supply control unit 13 to eject the card device.

Thereby, the card device can be ejected essentially at the same time the supply of power to the card device is stopped.

[Fourth Embodiment]

In the first, second and third embodiments, the mode in which power is supplied to the card device with the main power supply of the host device being off is selected only by operating the input unit 14. If this mode selection is made at the same time the card device is plugged into the slot in the state in which the main power supply of the host device is turned off, the operability will improve significantly. The fourth embodiment is thus directed to a system in which the mode in which power is supplied to the card device with the main power supply of the host device being off is selected in response to the card device being plugged into the slot.

The operation of plugging the card device 200 into the slot with the main power supply of the host device 100 being turned off is regarded as an operation from the input unit 14 to allow the selection of the mode in which power is supplied to the card device with the main power supply being turned off. For example, this corresponds to such a case as where the input unit 14 is a contact switch in the connector 12 as shown in FIG. 7.

Figure 8:
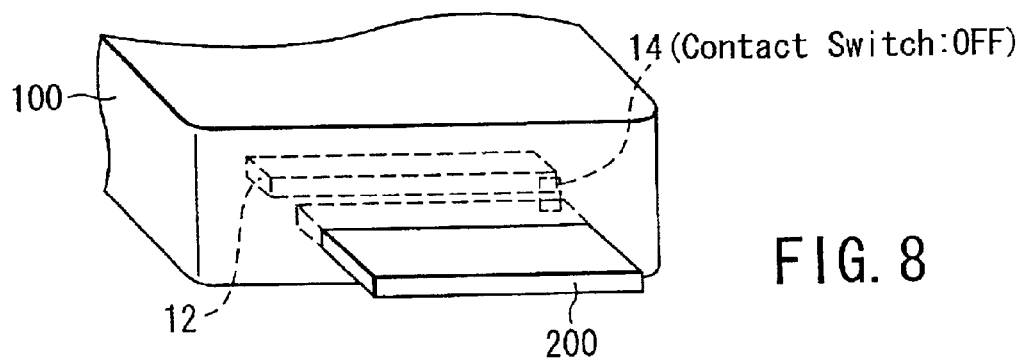
FIGS. 8 and 9 show the operation of the mechanism of the host device for detecting the insertion into it of the card type of electronic device in a system according to a fourth embodiment of the invention.
Figure 9:
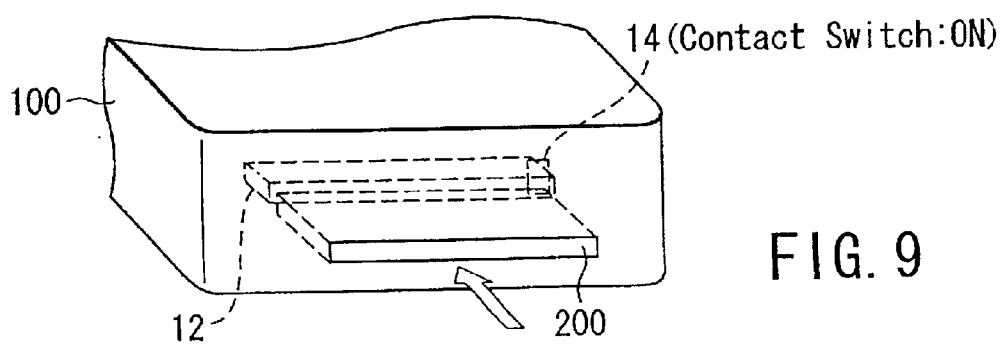

That is, when the card device 200 is plugged into the slot with the main supply of the host device 100 being off, i.e., when a transition is made from the initial state shown in FIG. 8 to the card-plugged-in state shown in FIG. 9, the power supply control unit 13 of the host device starts the supply of power to the card device.

Thus, plugging of the card device into the slot allows the mode in which power is supplied to the card device with the main power supply being turned off to be selected without the need for operating the input unit 14.

[Fifth Embodiment]

Next, a fifth embodiment of the invention will be described.

The fourth embodiment has been described in terms of the system in which the mode in which power is supplied to the card device with the main power supply of the host device being off is selected. The fifth embodiment is directed to a system in which the mode selection is made on the basis of the depth of insertion of the card.

Figure 10:
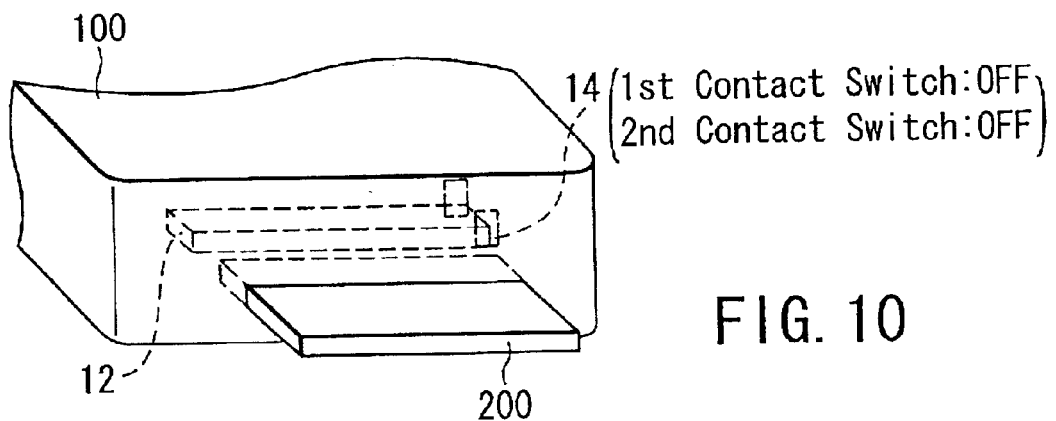
FIGS. 10, 11 and 12 show the operation of the mechanism of the host device for detecting the depth of insertion into it of the card type of electronic device in a system according to a fifth embodiment of the invention.
Figure 11:
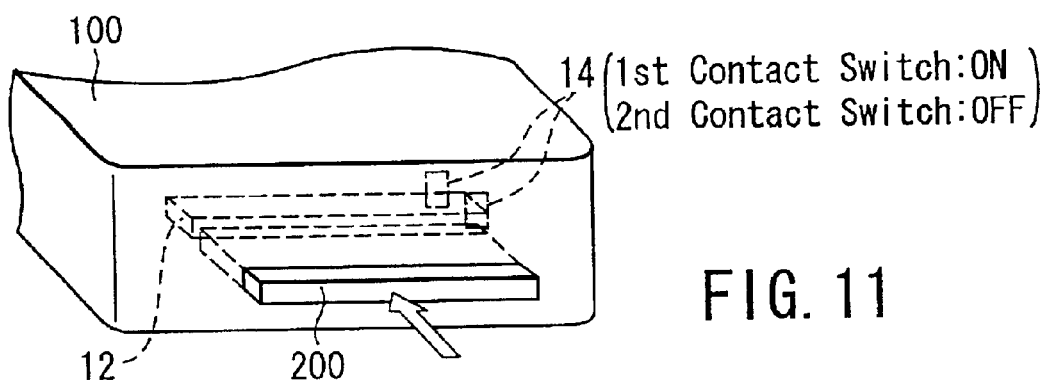
Figure 12:
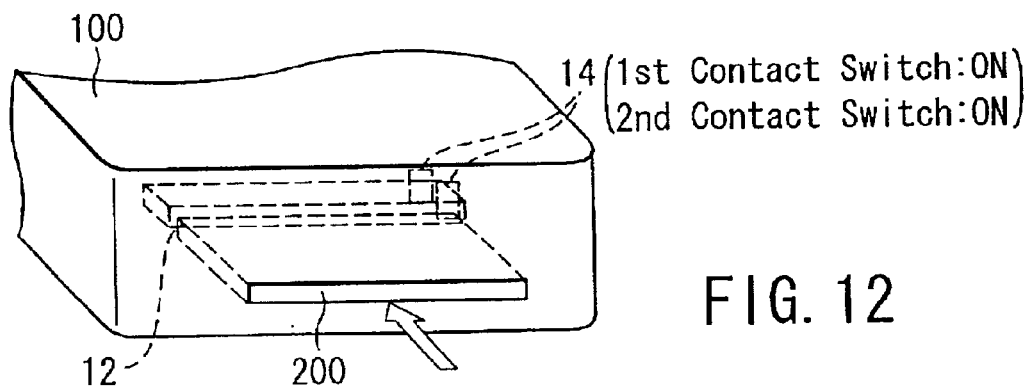

When the card device 200 is plugged into the slot with the main power supply of the host device 100 being off, the depth of insertion of the card is regarded as an operation from the input unit 14, thus allowing the selection of the mode in which power is supplied to the card device with the main power supply being turned off. For example, this system is implemented by providing, as shown in FIGS. 10, 11 and 12, a number of contact switches in the connector 12 as the input unit 14.

In the system, the depth of insertion of the card is detected in steps. In addition to the initial state (FIG. 10), in the first step the mode is selected in which power is supplied to the card device with the main power supply being turned off (FIG. 11) and, in the second step, the normal mode is selected in which the card device 200 is operated by an operating command from the host device 100 (FIG. 12).

Thus, the mode in which power is supplied to the card device with the main power supply of the host device being turned off can be selected based on the depth of insertion of the card device without the need for operating the input unit 14.

[Sixth Embodiment]

Next, a sixth embodiment of the invention will be described.

In the first embodiment, if, when an operating command from the host device 100 is awaited in step B1 in FIG. 3, there is no command within a fixed period in step B2, then the radio communication function of the card device 200 is activated in step B4. However, if the data lines in the connectors 12 and 22 include one that indicates whether the main power supply of the host device is turned on or off, the wait operation will become unnecessary. The sixth embodiment is thus directed to a system in which turning on the main power supply of the host device allows immediate activation of the radio communication function.

In the flowchart of FIG. 3, whether the main power supply of the host device 100 is turned on or off is determined through the presence or absence of an operating command from the host device. In the sixth embodiment, the wait operation for a fixed period in steps B1 and B2 is made unnecessary by providing the connectors 12 and 22 with one data line that indicates the state of the main power supply of the host device.

Thereby, the time to respond to the user can be reduced and wasteful power dissipation of the host device can be further reduced.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended claims and their equivalents.

What is claimed is:

1. An electronic device in which an expansion unit is connected, comprising:

a command device configured to give a command to supply power to the expansion unit; and a power supply control device configured to start the supply of power to the expansion unit when a command is given by the command device in a state where the electronic device is turned off, while keeping the power supply of the electronic device in an off state.

2. The electronic device according to claim 1 including a notification device configured to notify the expansion unit of the on/off state of the main power supply in the electronic device.

3. The electronic device according to claim 1 further comprising a receiving device configured to receive from the expansion unit a command to stop the supply of power, and wherein the power supply control unit stops the supply of power to the expansion unit in response to said command from the expansion unit.

4. An electronic device in which an expansion unit is connected, comprising:

a detection device configured to detect whether or not the expansion unit is connected to the connection device; and a power supply control device configured to start the supply of power to the expansion unit when connection of the expansion unit is detected by the detection device in a state where the electronic device is turned off, while keeping the power supply of the electronic device in an off state.

5. The electronic device according to claim 4 including a notification device configured to notify the expansion unit of the on/off state of the main power supply in the electronic device.

6. The electronic device according to claim 4 including a receiving device configured to receive from the expansion unit a command to stop the supply of power, and wherein the power supply control unit stops the supply of power to the expansion unit in response to the command from the expansion unit.

7. A power supply control method for an electronic device in which an expansion unit is connected, the method comprising:

giving a command to supply power to the expansion unit; and starting the supply of power to the expansion unit when a command is given in a state where the electronic device is turned off, while keeping the power supply of the electronic device in an off state.

* * * * *